(12) United States Patent
Machani et al.

(10) Patent No.: US 10,091,230 B1
(45) Date of Patent: Oct. 2, 2018

(54) AGGREGATING IDENTITY DATA FROM MULTIPLE SOURCES FOR USER CONTROLLED DISTRIBUTION TO TRUSTED RISK ENGINES

(71) Applicant: EMC Corporation, Hopkinton, MA (US)

(72) Inventors: Salah Machani, Toronto (CA); Kayvan Alikhani, Oakland, CA (US); Lawrence N. Friedman, Arlington, MA (US); Christopher Clifton McLaren, Cambridge (CA); Marcelo Blatt, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 373 days.

(21) Appl. No.: 14/980,101

(22) Filed: Dec. 28, 2015

(51) Int. Cl.
  *G06F 7/04* (2006.01)
  *H04L 29/06* (2006.01)
  *G06F 21/57* (2013.01)
  *H04L 29/08* (2006.01)

(52) U.S. Cl.
  CPC ........ *H04L 63/1433* (2013.01); *G06F 21/577* (2013.01); *H04L 63/08* (2013.01); *H04L 63/10* (2013.01); *H04L 67/30* (2013.01)

(58) Field of Classification Search
  CPC ... G06F 21/6218; G06F 21/577; H04L 63/08; H04L 63/1433; H04L 63/10; H04L 67/30
  USPC .......................................................... 726/4
  See application file for complete search history.

(56) References Cited

U.S. PATENT DOCUMENTS

| | | | |
|---|---|---|---|
| 7,873,566 B1 * | 1/2011 | Templeton ........... | G06Q 20/042 705/35 |
| 8,091,120 B2 | 1/2012 | Perrella et al. | |
| 8,621,586 B1 | 12/2013 | Peer et al. | |
| 8,646,060 B1 | 2/2014 | Ben Ayed | |
| 8,832,790 B1 | 9/2014 | Villa et al. | |
| 8,856,923 B1 | 10/2014 | Kolman et al. | |
| 8,875,267 B1 | 10/2014 | Kolman et al. | |
| 8,973,096 B1 | 3/2015 | Villa et al. | |
| 9,203,860 B1 | 12/2015 | Casillas et al. | |
| 9,300,649 B2 * | 3/2016 | Dickinson ............... | H04L 63/08 |
| 9,679,125 B2 * | 6/2017 | Bailor ................... | G06F 21/316 |
| 2003/0233325 A1 * | 12/2003 | Belyi ................... | G06Q 20/108 705/42 |
| 2013/0160013 A1 * | 6/2013 | Pires ....................... | G06F 21/41 718/1 |
| 2013/0227712 A1 * | 8/2013 | Salem ................. | G06F 21/6218 726/30 |

(Continued)

*Primary Examiner* — Kambiz Zand
*Assistant Examiner* — Aubrey H Wyszynski
(74) *Attorney, Agent, or Firm* — BainwoodHuang (57) ABSTRACT

Identity data for a user is aggregated from multiple sources into a global profile, the contents of which is distributed under the control of the user to trusted risk engines. The collected identity data is related to the user's use of online services provided by multiple independent service providers. The collected identity data is aggregated into a private, global profile. The user must authorize the portion(s) of the aggregated identity data that is/are distributed, and one or more trusted risk engines to which the aggregated identity data may distributed. The global profile may be distributed to individual trusted risk engines, further based on requests received from individual ones of the trusted risk engines.

18 Claims, 4 Drawing Sheets

(56) References Cited

U.S. PATENT DOCUMENTS

| | | | |
|---|---|---|---|
| 2015/0026027 A1* | 1/2015 | Priess | G06Q 40/00 705/35 |
| 2015/0106888 A1* | 4/2015 | Cheng | G06F 21/62 726/5 |
| 2017/0140356 A1* | 5/2017 | Desai | G06Q 20/202 |

* cited by examiner

AGGREGATING IDENTITY DATA FROM MULTIPLE SOURCES FOR USER CONTROLLED DISTRIBUTION TO TRUSTED RISK ENGINES

BACKGROUND

In the area of computer security, it is often useful to perform a risk assessment. For example, a computer security system may perform a risk assessment when determining whether a user requesting access to a secure resource should be allowed to access the secure resource. In such a case, a risk assessment may generate a result indicating a level of risk that the user requesting access to the secure resource is an imposter. If the result of the risk assessment indicates a high level of risk (e.g. a high level of risk that the user is an imposter), then the security system may either deny access to the resource, provide only restricted access to the resource, or require a more rigorous authentication process be performed in order for the user to access the resource. The specific action performed by a computer security system in response to detecting a high level of risk with regard to a given request often depends on the specific security policies defined in the system.

Risk assessments may be performed based on various types of identity data that describes a user and/or the user's past behavior. In some computer security systems, risk assessments are performed automatically using a risk engine that takes as inputs various pieces of identity data about the user, and then outputs a risk score. The risk score output by a risk engine can be used within the computer security system to determine whether to grant the user's request to access a secure resource, and/or to determine whether additional authentication steps must be performed by the user as part of the request to access the secure resource.

SUMMARY

Previous approaches to performing user risk assessments have had significant shortcomings. While the number of different online services used by each individual user continues to increase, each service provider has performed its own risk assessments, based on information about the user that it collects directly from the user, and/or based on information about the user's behavior that it has directly observed. As a result, risk assessments have been based only on local identity information collected by individual service providers. Risk assessments generated in previous systems have accordingly been based on proportionally small amounts of identity data for a user, relative to a typical user's totality of activity on the Internet. Risk assessments generated in previous systems have therefore been relatively limited in their ability to accurately determine a true level of risk. Security systems and the risk engines they contain have had no ability to leverage identity data from multiple online service providers that provide online services to the user. And users have not had the ability to indicate specific entities that are to receive identity data from the various service providers that provide online services to the user for the purpose of performing risk assessments.

In order to address the above described and other shortcomings of previous systems, new techniques are disclosed herein for aggregating a user's identity data from multiple sources into a privately maintained global profile, such that the global profile can be distributed under the user's control to one or more trusted risk engines. In the disclosed system, identity data associated with a user is collected from multiple service providers. Each of the service providers provides a different online service to the user. The identity data collected from each of the service providers includes one or more identity attributes describing the user's use of the online service provided by the service provider.

The collected identity data is aggregated into a global profile associated with the user. Access to the global profile is controlled such that operations that access the global profile must be authorized by the user.

The global profile may be identified by a user identifier that is unique to the user, and aggregate identity data reflecting the user's use of one or more of the online services provided by one or more of the service providers, regardless of the user device from which the user accessed the online service. Alternatively, the global profile may be identified by a device identifier that is unique to a user device, and aggregate identity data reflecting the user's use of one or more of the online services provided by one or more of the service providers from that device.

The contents of the global profile may be distributed to multiple trusted risk engines. The distribution of the global profile is performed in response to one or more distribution authorizations received from the user. The distribution authorization indicates at least a portion of the global profile, and distribution of the global profile includes sending the indicated portion of the global profile to one or more of the trusted risk engines. The portion of the global profile distributed to the trusted risk engines is used by the recipient trusted risk engines to perform risk assessments while processing requests to access at least one secure resource.

The trusted risk engines may or may not be independent and separately operating from the service providers, and the secure resource may include an online service provided by one of the service providers. Accordingly, using the disclosed system, a service provider can leverage both local identity data collected directly from the user (e.g. through a user agent executing as a client on a user device), and/or one or more portions of identity data that are collected from one or more other service providers, aggregated into the global profile, and distributed to a trusted risk engine that is integral to or used by the service provider.

The distribution authorization from the user may indicate a subset of the trusted risk engines to which the portion of the global profile is to be distributed. Distribution of the global profile to the trusted risk engines may include sending the indicated portion of the global profile only to the subset of the trusted risk engines indicated by the distribution authorization received from the user.

An identity data source authorization may also be received from the user. The identity data source authorization may indicate the service providers from which identity data associated with the user may be collected. Collecting the identity data associated with the user may be responsive to the identity data source authorization received from the user, and be performed by collecting identity data associated with the user only from service providers indicated by the identity data source authorization received from the user.

The identity attributes describing the user's use of the online service may consist of various different types of data describing various different ways the user has used the online service. An identity attribute may be a result of a risk assessment performed by the service provider in response to a request by the user to access the online service provided by the service provider. Such a result of a risk assessment performed by the service provider may consist of or include a risk score. Other types of identity attributes may describe various other actions performed either by the user or by the service provider while providing the online service to the user.

The collected identity data may have multiple different formats. In one embodiment, aggregating the collected identity information into the global profile includes generating normalized user identity data at least by combining and/or reformatting the collected identity data into normalized identity data having a single, normalized format. Distributing the global profile to the trusted risk engines may then include distributing the normalized identity data to the trusted risk engines.

The disclosed system may be embodied such that distribution of the global profile may also be responsive to specific requests received from the trusted risk engines. For example, distribution of the global profile may be further responsive to receipt of a subscription or query request from one of the trusted risk engines. A request from a trusted risk engine may indicate specific aspects of how the global profile is to be distributed to the trusted risk engine. For example, the request may indicate a subset of the service providers, and the global profile may be distributed by sending only identity data collected from the subset of service providers indicated by the request to the trusted risk engines from which the request was received. In another example, the request may indicate a distribution event condition, and a portion of the global profile may be sent to the trusted risk engine from which the request was received only in response to detecting an occurrence of the event condition.

The disclosed system may be embodied to provide significant improvements over previous systems. For example, the disclosed system advantageously leverages identity data that is collected across multiple service providers. The disclosed system may also advantageously enable users to selectively share the identity data collected from the multiple service providers with specific trusted risk engines. The distribution of identity data aggregated from different service providers helps provide more reliable and effective risk assessments for access control and/or authentication. And allowing users to indicate which systems have access to specific portions of their identity data helps preserve user privacy.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention is broader than the specific examples of embodiments disclosed herein.

Figure 1:
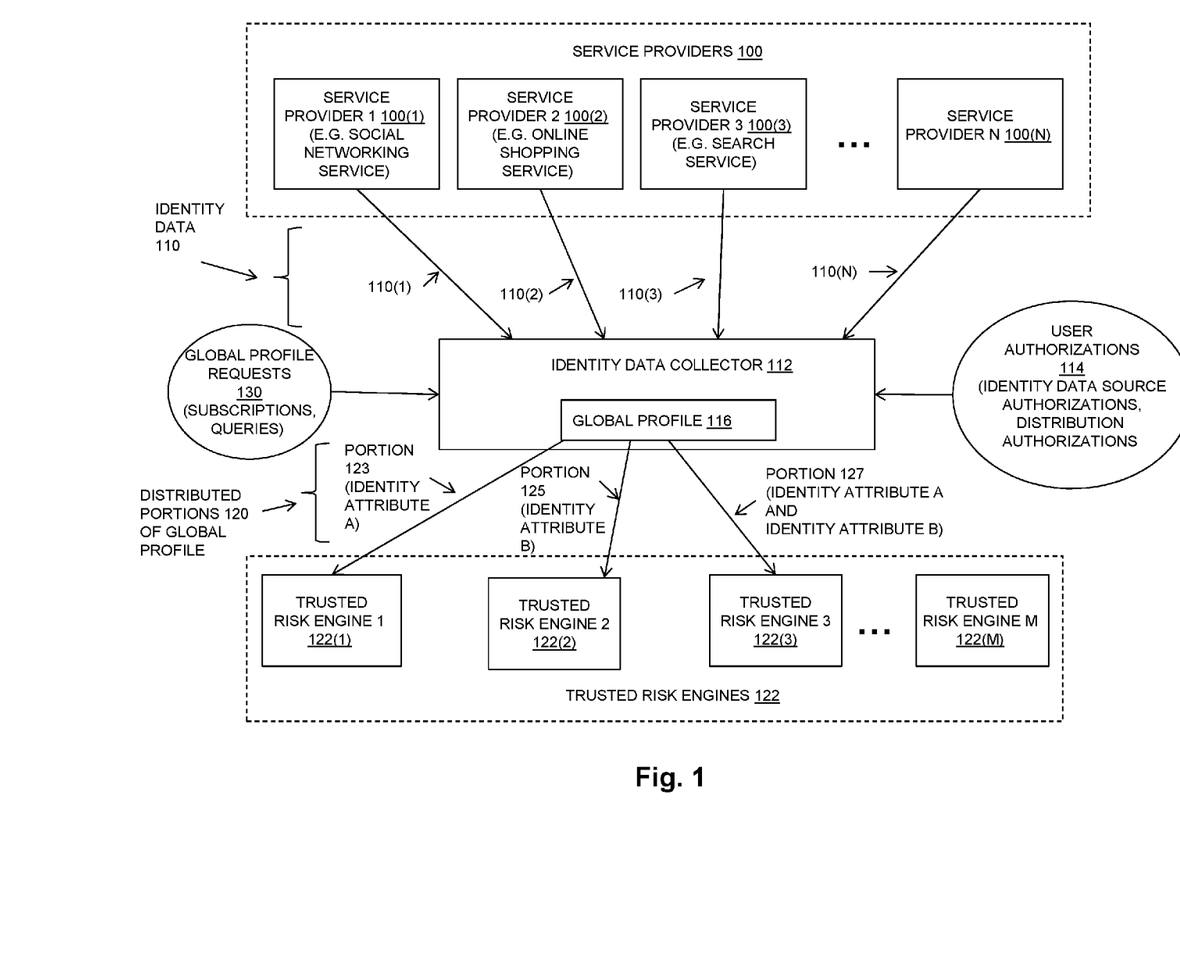
FIG. 1 is a block diagram showing an operational environment including an illustrative embodiment of the disclosed system.

FIG. 1 is a block diagram showing an operational environment including an illustrative embodiment of the disclosed system for aggregating a user's identity data from multiple sources into a privately maintained global profile, such that the global profile can be distributed under the user's control to one or more trusted risk engines. As shown in FIG. 1, identity data associated with a user, shown as Identity Data 110, is collected by Identity Data Collector 112 from multiple service providers, shown as Service Providers 100. For purposes of illustration, Service Providers 100 include N different service providers, shown by Service Provider 1 100(1), Service Provider 2 100(2), Service Provider 3 100(3), through Service Provider N 100(N). Each one of Service Providers 100 provides a different online service to the user. In the example of FIG. 1, Service Provider 1 100(1) provides an online social networking service to the user, Service Provider 2 100(2) provides an online shopping service to the user, and Service Provider 3 100(3) provides an online search service to the user. The specific types of online services shown in FIG. 1 are solely for purposes of illustration and explanation, and the disclosed system may be embodied or configured using identity data collected from any specific types of service providers that provide any specific types of online services to the user.

The Identity Data 110 collected by Identity Data Collector 112 from each one of the service providers in Service Providers 100 describes the user's use of the online service provided by that individual service provider. Accordingly, Identity Data 110 includes identity data 110(1) that describes the user's use of the online social networking service provided to the user by Service Provider 1 100(1), identity data 110(2) that describes the user's use of the online shopping service provided to the user by Service Provider 2 100(2), identity data 110(3) that describes the user's use of the online search service provided to the user by Service Provider 3 100(3), and so on for each of the service providers through identity data 110(N) that describes the user's use of an online service provided to the user by Service Provider N 100(N).

Each individual item of data contained within the Identity Data 110 that describes the user's use of one of the online services provided by Service Providers 100 is referred to herein as an identity attribute. Identity attributes in the Identity Data 110 collected from the Service Providers 100 describe how the user used the specific online service provided by the individual service providers. Identity attributes collected in Identity Data 110 may include the specific days of the week and/or times of day during which the user accessed an online service, the specific device(s) used by the user to access an online service, the geographic location of the user when accessing an online service, the time duration(s) between accesses by the user to an online service, the internet service provider(s) used by the user when accessing an online service, and/or indications of other actions taken by the user or the service provider while providing the online service. Some identity data collected from individual ones of the Service Providers 100 may provide an identity attribute that describes a current geographic location of the user at all times, as maintained by the online service provided by the service provider.

The specific identity attributes collected from each one of the Service Providers 100 may reflect the specific type of online service provided by the service provider. For example, identity data 110(1) collected from Service Provider 1 100(1) describes the user's use of the online social networking service provided by Service Provider 1 100(1), and identity attributes included in such identity data may, for example, include identifiers of online friends of the user contained in a list or graph of online friends maintained for the user by the social networking service. Identity data 110(2) collected from Service Provider 2 100(2) describes the user's use of the online shopping service provided by Service Provider 2 100(2), and identity attributes included in such identity data may, for example, include indications of items purchased by the user through the online shopping service. Identity data 110(3) collected from Service Provider 3 100(3) describes the user's use of the online search service provided by Service Provider 3 100(3), and identity attributes in such identity data may, for example, include a history of searches performed by the user using the online search service, such as search queries issued by the user, search results presented to the user, and items selected by the user for viewing within the presented search results.

The identity attributes collected from each one of the Service Providers 100 may also include the results of risk assessments performed by individual service providers in response to requests by the user to access the online service provided by the service provider. Such results of risk assessments performed by individual ones of the Service Providers 100 may each consist of or include a risk score having a value indicating a probability determined by the service provider, e.g. at the time of the user's request to access the online service provided by the service provider, that the user's request to access the online service was fraudulent (i.e. the probability that the user was an imposter). For example, higher value risk scores indicate higher probabilities that the issuer of the request is an imposter, and lower value risk scores indicate lower probabilities that the issuer of the request is an imposter. The risk score calculated by one of the Service Providers 100 may be used by the service provider to determine whether to grant the request to access the online service provided by the service provider, and/or to determine specific authentication steps that are to be performed to process the user's request to access the online service. For example, in the case of a risk score having a value that exceeds a first threshold probability (e.g. greater than fifty percent) that the issuer of the request is an imposter, the service provider may require the requester to perform additional authentication steps prior to accessing the online service, such as answering additional questions and/or entering additional identifying information. In another example, in the case of a risk score having a value that exceeds a second threshold probability (e.g. greater than ninety percent) that the issuer of the request is an imposter, the request to access the online resource may be denied. Those skilled in the art will recognize that various other specific threshold values and resulting actions may be used as alternatives to the preceding examples.

The Identity Data 110 collected by Identity Data Collector 112 is aggregated by Identity Data Collector 112 into a Global Profile 116 associated with the user. The Global Profile 116 may be identified by a user identifier that is unique to the user, and aggregate identity data reflecting the user's use of one or more of the online services provided by one or more of Service Providers 100, regardless of the user device from which the user accessed the online service. Alternatively, the global profile may be identified by a device identifier that is unique to a user device, and aggregate identity data reflecting the user's use of the online service provided by each of the Service Providers 100 from that device.

All access to the Global Profile 116 is controlled by Identity Data Collector 112 such that any operations that access the global profile must be authorized by the user, e.g. in one or more of User Authorizations 114. Accordingly, Identity Data Collector 112 only aggregates identity data into Global Profile 116 that is a collected from service providers indicated by identity source authorizations received from the user in User Authorizations 114, and only distributes identity data from Global Profile 116 to entities indicated by distribution authorizations received from the user in User Authorizations 114.

User Authorizations 114 may optionally include time-constraints. For example, a distribution authorization may authorize distribution of a portion of Global Profile 116 for a period of time between an indicated start time and an indicated end time. In addition, Identity Data Collector 112 may optionally further operate in response to identity source revocations, for example provided in User Authorizations 114. An identity source revocation may, for example, revoke authorization to collect and/or distribute identity data from an indicated one of Service Providers 100. In response to receipt of an identity source revocation, Identity Data Collector 112 terminates the collection and/or distribution of any identity data from the indicated service provider, and may further send a notification of the termination to the indicated service provider.

Identity attributes that are collected from different ones of the Service Providers 100 may represent the same type of data using different formats. Aggregating the collected Identity Data 110 into the Global Profile 116 may include generating normalized user identity data by combining identity attributes of the same type that are collected from different ones of the Service Providers 100, and/or by reformatting the collected or combined identity attributes into normalized identity data having a normalized format. Distributing the Global Profile 116 to the Trusted Risk Engines 122 may then include distributing the normalized identity data to the trusted risk engines.

Identity Data 110 may be collected and/or aggregated into Global Profile 116 as identity attributes having names and values. In such a configuration or embodiment, each identity attribute has an attribute name and an attribute value, and individual identity attributes may be accessed (e.g. collected or distributed by Identity Data Collector 112) based on their respective names. Values of identity attributes may be encrypted, e.g. by the service provider(s) from which they are received. In the case where an attribute's value is encrypted by a service provider, the necessary decryption key may not be known or available to the Identity Data Collector 112. In this way, individual ones of Service Providers 100 may share/exchange attribute values without exposing them to the Identity Data Collector 112 and/or other ones of the Service Providers 100. A recipient of an identity attribute having an encrypted value (e.g. one of Trusted Risk Engines 122) may accordingly be directly provided with the necessary decryption key, e.g. from the service provider from which the identity attribute was collected, in order to decrypt the encrypted value of the identity attribute, without the decryption key being made available to or stored in Identity Data Collector 112.

For example, the disclosed system may be embodied to collect identity attributes in Identity Data 110 that include or consist of risk scores calculated by different ones of the Service Providers 100 for requests by the user to access the online services provided by those service providers, and where the risk scores from different ones of the service providers have different formats. For example, an identity attribute describing the user's use of the online service provided by Service Provider 1 100(1), may consist of or include a risk score resulting from a risk assessment performed by Service Provider 1 100(1) in response to a request by the user to access the online service provided by Service Provider 1 100(1). The risk score resulting from the risk assessment performed by Service Provider 1 100(1) may have a first risk score format. For example, the risk score resulting from the risk assessment performed by Service Provider 1 100(1) may have a format in which the risk that the request is being made by an imposter is represented by integer values from 0 to 10, where higher values represent higher probabilities that the request is being made by an imposter. An identity attribute describing the user's use of the online service collected from Service Provider 2 100(2) may consist of or include a risk score resulting from a risk assessment performed by Service Provider 2 100(2) in response to a request by the user to access the online service provided by Service Provider 2 100(2). The risk score resulting from the risk assessment performed by Service Provider 2 100(2) may have a second risk score format. For example, the risk score resulting from the risk assessment performed by Service Provider 2 100(2) may have a format in which the risk that the request is being made by an imposter is represented by integer values between 0 and 100, where higher values represent higher probabilities that the request is being made by an imposter. Identity Collector 112 may generate normalized user identity data by converting both the risk score resulting from the risk assessment performed by Service Provider 1 100(1) and the risk score resulting from the risk assessment performed by Service Provider 2 100(2) to a common scale referred to as a normalized format, e.g. to a probability value between 0 and 1, where higher values represent higher probabilities that the request is being made by an imposter. Such normalized identity data may then be stored as normalized risk scores in the Global Profile 116. The Identity Collector 112 may additionally combine the two risk scores, for example by calculating an average of the risk score values, and then store the result of the combination in the Global Profile 116 using the normalized format (percentage values between 0 and 100) as a global normalized risk score.

Other types of normalization may be performed on other types of identity attributes received in the Identity Data 110 to generate normalized identity data. For example, in the case where different service providers have different formats for names (e.g. names of friends or contacts of the user), the disclosed system may generate normalized user names by converting the user names in Identity Data 110 to a common user name format.

The contents of Global Profile 116 is selectively distributed, based on one or more distribution authorizations in User Authorizations 114, to some number of trusted risk engines indicated in the distribution authorizations, shown for purposes of illustration in FIG. 1 by Trusted Risk Engines 122. The distribution authorizations in User Authorizations may, for example, indicate individual trusted risk engines in Trusted Risk Engines 122 using Uniform Resource Locators (URLs), or using some other type of entity address or name. The distribution authorizations in User Authorizations 114 may, also for example, indicate one or more portions of the Global Profile 116 that are subsets of the contents of Global Profile 116, and the individual ones of the Trusted Risk Engines 122 that each portion of the Global Profile 116 is to be distributed to.

Each of the Trusted Risk Engines 122 may be operable to perform a risk assessment in response to a request to access a secure resource, in which the issuer of the request enters or otherwise submits a user identifier (e.g. username, email address, etc.) that is the same as a user identifier uniquely assigned to the user associated with Global Profile 116. The secure resource to which the request is directed may, for example, consist of or include any secure resource provided by a computer and/or computer network, such as a Web site, online service, application program, confidential or proprietary data, cloud computing resource, computer system, and/or any other type of secure resource for which authentication may be required for access. The secure resource may be one of the online services provided by the Service Providers 100. The request to access the secure resource may, for example, consist of or include one or more Hyper-Text Transfer Protocol (HTTP) messages (e.g. HTTP GET).

Each of the Trusted Risk Engines 122 may or may not be independent and separate from the Service Providers 100. One or more of the Trusted Risk Engines 122 may be integral to or used by one or more of the Service Providers 100 to perform risk assessments in response to requests to access secure resources consisting of the online services provided by those ones of Service Providers 100. Accordingly, each of Service Providers 100 can operate by using both local identity data collected directly from the user (e.g. through a user agent executing as a client on a user device), and/or using one or more portions of identity data that are collected from one or more other service providers, aggregated into the Global Profile 116, and distributed to one of Trusted Risk Engines 122 that is integral to or used by the service provider.

The output of a risk assessment performed by one of Trusted Risk Engines 122 is a risk score having a value indicating a probability that the issuer of the request for the secure resource is an imposter, i.e. is not the user associated with Global Profile 116. Higher value risk scores may indicate higher probabilities that the issuer of the request is an imposter, and lower value risk scores indicate lower probabilities that the issuer of the request is an imposter. The risk score output by a trusted risk engine can be used by a consumer of risk assessments performed by the trusted risk engine (e.g. by one of the Service Providers 100) to determine whether to grant a request to access a secure resource, and/or to determine authentication steps that must be performed to process the user's request to access the secure resource. For example, in the case of a risk score having a value that exceeds a first threshold probability (e.g. greater than fifty percent) that the issuer of the request is an imposter, the issuer of the request may be required to perform additional authentication steps prior to accessing the secure resource, such as answering additional questions and/or entering additional identifying information. In another example, in the case of a risk score having a value that exceeds a second threshold probability (e.g. greater than ninety percent) that the issuer of the request is an imposter, the request to access the secure resource may be denied. Those skilled in the art will recognize that various other specific threshold values and resulting actions may be used as alternatives to the preceding examples.

One or more of the Trusted Risk Engines 122 may operate to perform a risk assessment in response to a request to access a secure resource, where the issuer of the request is identified by a user identifier that is the same as the user identifier of the user associated with Global Profile 116, using a normalized risk score, or a global normalized risk score, that is distributed as one of the identity attributes from Global Profile 116. For example, the trusted risk engine may perform the risk assessment by outputting a risk score that is a normalized risk score distributed to the trusted engine, and that is a risk score collected from one of the Service Providers 100 and converted to a normalized risk score format. Alternatively, the trusted risk engine may perform the risk assessment by outputting a risk score that is a global normalized risk score distributed to the trusted engine, where the global normalized risk score is a combination (e.g. average) of risk scores collected from multiple ones of the Service Providers 100, and converted to a normalized risk score format.

In another example, one or more of the Trusted Risk Engines 122 may perform a risk assessment in response to a request to access a secure resource, in which the issuer of the request is identified by a user identifier that is the same as the user identifier of the user associated with Global Profile 116, by comparing the values of one or more attributes of the request (request attributes) to the values of one or more corresponding identity attributes distributed from Global Profile 116 to the trusted risk engine. In such a case, the risk score output from the risk assessment performed by the trusted risk engine has a relatively higher value (i.e. indicates a higher probability that the issuer of the request is an imposter) in response to relatively higher numbers of mismatches between the identity attributes distributed from Global Profile 116 and corresponding attributes of the request. For example, a trusted risk engine may generate a high value risk score for the request if comparing the attributes of the request to identity attributes distributed from Global Profile 116 reveals that i) the geographic location from which the request is being made differs from previous geographic locations from which the user associated with Global Profile 116 accessed one or more of the online services provided by Service Providers 100, and/or differs from a current geographic location of the user, ii) the day of the week during which the request is issued differs from the days of the week during which the user associated with Global Profile 116 accessed one or more of the online services provided by Service Providers 100, iii) the time of day at which the request is issued differs from times of day during which the user associated with Global Profile 116 accessed one or more of the online services provided by Service Providers 100, iv) a time duration since a previous request was made differs from previous time durations between accesses to one or more of the online services provided by Service Providers 100 by the user associated with Global Profile 116, v) the internet service provider being used for the request differs from the internet service provider used by the user associated with Global Profile 116 to access one or more of the online services provided by Service Providers 100, and/or any under any other conditions where the attributes of the request are anomalous with regard to identity attributes distributed from the Global Profile 116.

The trusted risk engines to which portions of the Global Profile 116 are distributed are indicated by distribution authorizations received from the user in User Authorizations 114. The distribution authorizations in User Authorizations 114 may include indications of specific portions of Global Profile 116, e.g. indications of specific identity attributes stored in the Global Profile 116, and indications of the specific ones of the Trusted Risk Engines 122 that the indicated portions of Global Profile 116 are to be distributed to. In other words, different identity attributes from Global Profile 116 may be distributed to different ones of the Trusted Risk Engines 122, depending on specific distribution authorizations provided by the user in User Authorizations 114. For example, as shown for purposes of illustration in FIG. 1, the Distributed Portions 120 of Global Profile 116 may be distributed such that a first portion of Global Profile 116, shown as Portion 123 (e.g. including or consisting of an Identity Attribute A), is sent by Identity Data Collector 112 to Trusted Risk Engine 1 122(1), a second portion of Global Profile 116, shown as Portion 125 (e.g. including or consisting of an Identity Attribute B) is sent by Identity Data Collector 112 to Trusted Risk Engine 2 122(2), and a third portion of Global Profile 116, shown as Portion 127 (e.g. including or consisting of both Identity Attribute A and Identity Attribute B) is sent by Identity Data Collector 112 to Trusted Risk Engine 3 122(3).

By distributing portions of the contents of Global Profile 116 under the user's control (i.e. in response to distribution authorizations in User Authorizations 114) to specific ones of the Trusted Risk Engines 122, the disclosed system enables the user to indicate which user attributes are to be shared with specific ones of the Trusted Risk Engines 122. For example, in a case where one or more of the identity attributes in Global Profile 116 describes the user's use of an online banking service or the like, the user may not wish for such potentially sensitive financial information to be distributed to certain, less trustworthy ones of the Trusted Risk Engines 122. Using the disclosed system, the user may accordingly provide distribution authorizations in User Authorizations 114 that only indicate distribution of identity attributes describing the user's use of the online banking service to specific, more trustworthy ones of the Trusted Risk Engines 122.

The User Authorizations 114 received from the user may further include one or more identity data source authorizations. The identity data source authorization(s) may indicate the service providers from which identity data associated with the user is collected, e.g. may indicate each one of Service Providers 100. For example, the identity data source authorization(s) may indicate each one of Service Providers 100 by way of a Uniform Resource Locator (URL), or using some other type of address or name. Collecting the identity data associated with the user by Identity Data Collector 112 may be responsive to the indications of the Service Providers 100 in the identity data source authorization(s) received from the user, and may be performed by collecting identity data associated with the user only from Service Providers 100, i.e. only from service providers indicated by the identity data source authorization(s) received from the user. This feature of the disclosed system enables the user to control the specific service providers from which identity data is collected and aggregated into the Global Profile 116.

The disclosed system may be embodied such that distribution of the Global Profile 116 by Identity Data Collector 112 is further responsive to specific requests received from individual ones of Trusted Risk Engines 122. Such requests are shown for purposes of illustration in FIG. 1 by Global Profile Requests 130. The Global Profile Requests 130 may include subscription requests, indicating a specific portion or portions of the Global Profile 116 that to be distributed to a specific one of Trusted Risk Engines 122 either periodically, or each time a distribution event condition is detected. For example, a subscription request may indicate a distribution event condition that is receipt of a threshold number of risk scores for the user that exceed a threshold probability of fraud. In such a case, when Identity Data Collector 112 has received the threshold number of risk scores for the user that exceed the threshold probability of fraud, then Identity Data Collector 112 distributes the portion or portions of the Global Profile 116 indicated by the subscription request to the one of Trusted Risk Engines 122 that issued the subscription request.

The Global Profile Requests 130 may include identity data queries that indicate a specific portion or portions of the Global Profile 116 that is to be distributed (e.g. immediately) to one of Trusted Risk Engines 122 that issued the query. For example, an identity data query may request a portion of Global Profile 116 that includes identity data (e.g. risk scores) related to online service requests issued from a specific user device. In response to such a query, Identity Data Collector 112 distributes the portion of Global Profile 116 that includes identity data (e.g. risk scores) related to online service requests from the specified user device to the one of the Trusted Risk Engines 122 from which the query was received. In another example, an identity data query may indicate a subset of the Service Providers 100, and Identity Data Collector 112 may respond to receipt of the query by distributing the portion of Global Profile 116 that includes identity data collected from the subset of service providers indicated by the query to the one of the Trusted Risk Engines 122 from which the identity data query was received.

Those skilled in the art will recognize that each of the Service Providers 100, Identity Data Collector 112, and each of Trusted Risk Engines 122 may, for example, consist of or include one or more software processes provided by program code executing on one or more computer systems. Service Providers 100, Identity Data Collector 112, and Trusted Risk Engines 122 may be communicably connected by one or more communication networks, including but not limited to the Internet. Communications between Service Providers 100, Identity Data Collector 112, and Trusted Risk Engines 122 may, for example, be accomplished using any appropriate type of computer and/or data communication protocol, including but not limited to the Internet protocol suite commonly known as TCP/IP (Transmission Control Protocol/Internet Protocol). Communications between Service Providers 100, Identity Data Collector 112, and Trusted Risk Engines 122 may also, for example, be accomplished based on URLs (Uniform Resource Locators) assigned to individual ones of Service Providers 100, Identity Data Collector 112, and Trusted Risk Engines 122. Such URLs may, for example, indicate Web APIs (Application Programming Interfaces) for individual ones of the Service Providers 100, Identity Data Collector 112, and Trusted Risk Engines 122.

Figure 2:
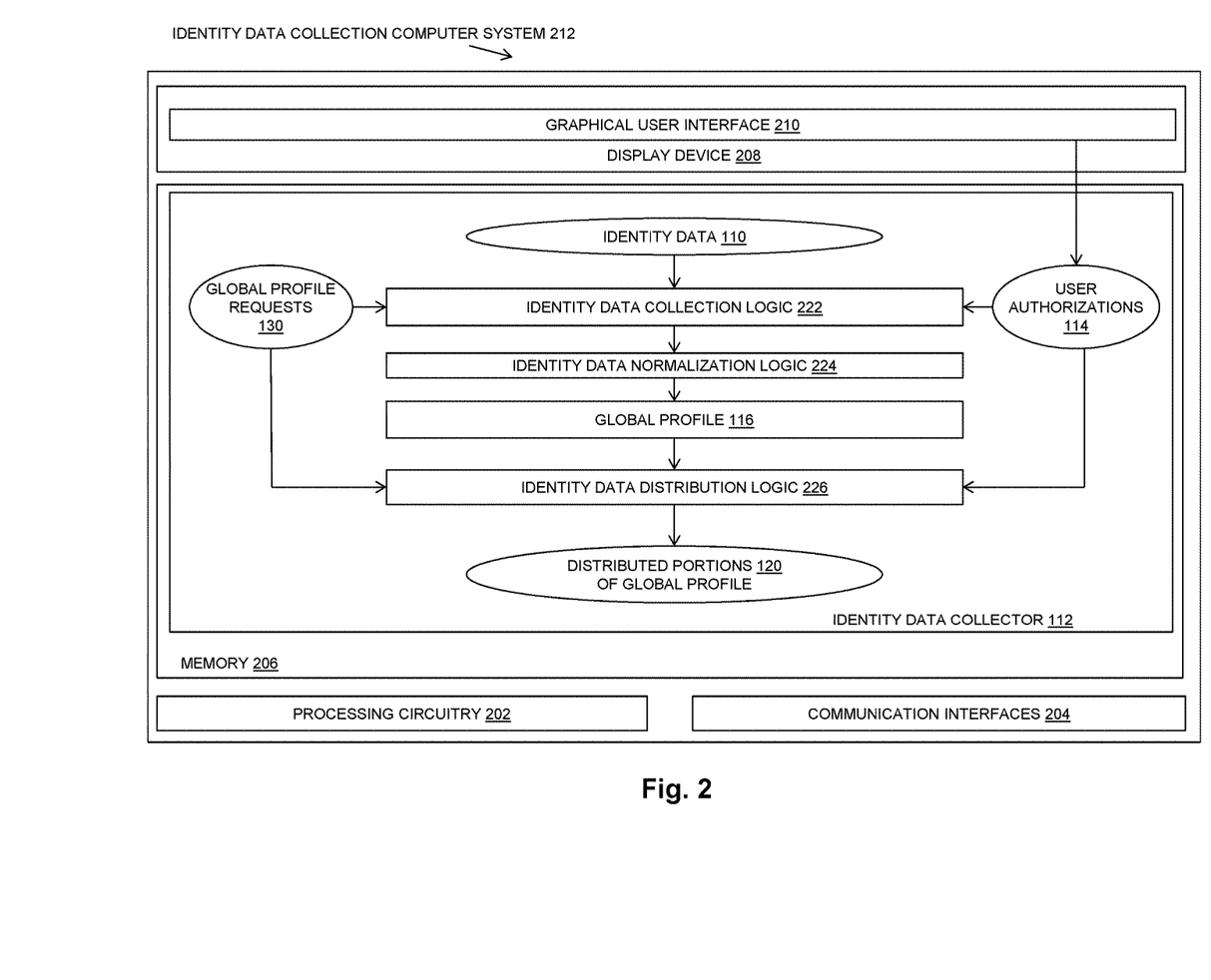
FIG. 2 is a block diagram showing an example of an identity data collection computer system including an embodiment of the disclosed identity data collector.

FIG. 2 is a block diagram showing an example of an Identity Data Collection Computer System 212, in which executes an embodiment of the disclosed Identity Data Collector 112. The Identity Data Collection Computer System 212 may consist of or include any specific type of computer, including but not limited to one or more server computers, a desktop computer, or a mobile device such as a laptop computer, tablet computer, smartphone, and/or any other specific type of computer having electronics, software, and network connectivity that enables the collection and exchange of data.

In the illustrative example of FIG. 2, Identity Data Collection Computer System 212 includes Processing Circuitry 202, Communication Interfaces 204, Memory 206, and a Display Device 208. Display Device 208 may include or consist of any specific type of output device operable to present the Graphical User Interface 210, such as a computer monitor, or any other type of electronic visual display. The Communication Interfaces 204 may, for example, include one or more network adapters and/or network interface cards for converting electronic and/or optical signals received over a network into electronic form for use by Identity Data Collection Computer System 212. The Processing Circuitry 202 may, for example, include or consist of one or more microprocessors, e.g. central processing units (CPUs), multi-core processors, chips, and/or assemblies.

The Memory 206 may, for example, include or consist of any type of computer memory, such as volatile memory (e.g., RAM), or non-volatile memory (e.g. NVRAM), and/or semiconductor, magnetic or optical secondary computer storage (e.g. solid state, magnetic, or optical drives), and/or another computer readable medium, for storing program code executable on Processing Circuitry 202, and for storing data operated on by such program code. Program code executable on Identity Data Collection Computer System 212 is shown including an embodiment of the Identity Data Collector 112 shown in FIG. 1, which may include various specific program components and/or modules, etc.

For purposes of illustration in FIG. 2, the program code components of Identity Data Collector 112 are shown to include Identity Data Collection Logic 222, Identity Data Normalization Logic 224, and Identity Data Distribution Logic 226. Those skilled in the art will recognize that while certain software constructs are specifically shown and described for purposes of explanation, the Memory 206 may additionally or alternatively include other software constructs, which are not shown in FIG. 2, such as an operating system, various applications, and/or other processes.

During operation of the embodiment of Identity Data Collector 112 shown in FIG. 2, Identity Data 110 is collected by Identity Data Collection Logic 222, from one or more service providers (e.g. Service Providers 100 in FIG. 1) as indicated by User Authorizations 114 and/or Global Profile Requests 130. As shown in FIG. 2, User Authorizations 114 may be received from the user through Graphical User Interface 210. Alternatively, User Authorizations 114 may be received from a remote computer system used by the user, through Communication Interfaces 204.

The Identity Data 110 is aggregated by Identity Data Collection Logic 222 and/or Identity Data Normalization Logic 224 into Global Profile 116. During aggregation of Identity Data 110 into Global Profile 116, identity attributes in Identity Data 110 of the same type but having different formats may be converted into normalized identity attributes having normalized formats, and/or combined into global normalized identity attributes having normalized formats, by Identity Data Normalization Logic 224.

Identity Data Distribution Logic 226 selectively distributes the contents of Global Profile 116, as shown by Distributed Portions 120, to one or more trusted risk engines (e.g. Trusted Risk Engines 122 in FIG. 1), as indicated by User Authorizations 114 and/or Global Profile Requests 130.

Figure 3:
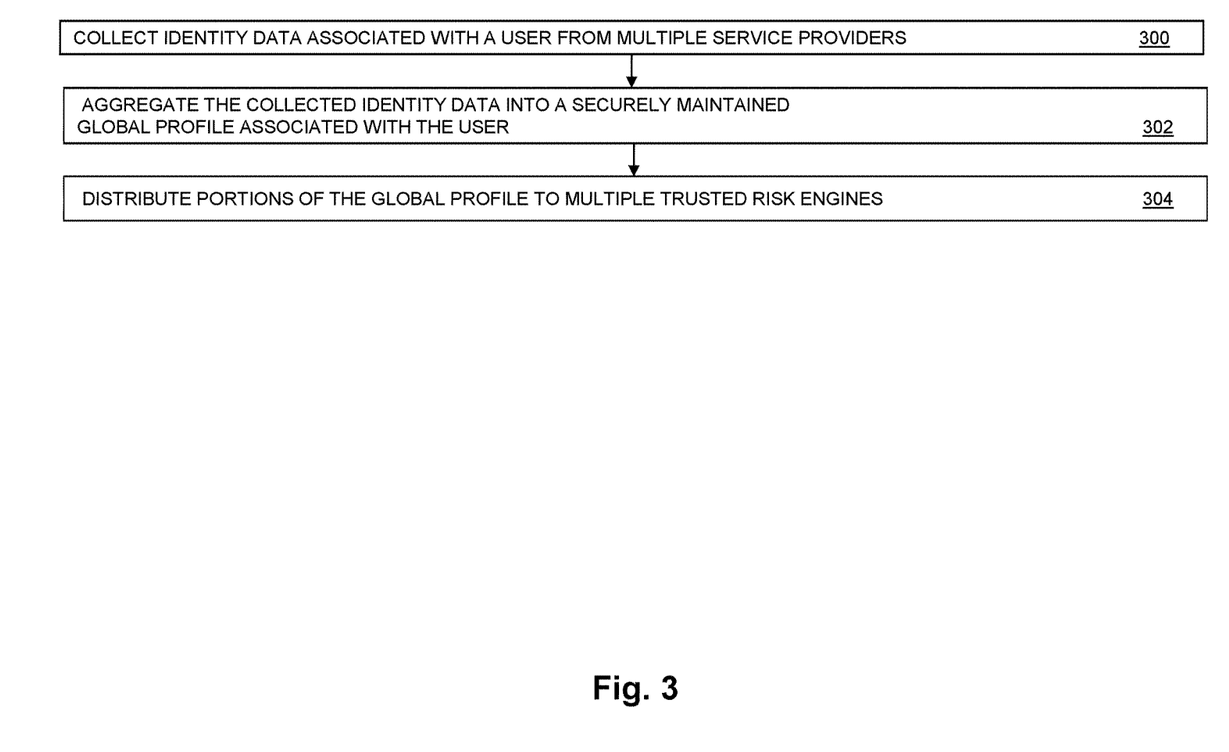
FIG. 3 is a flow chart showing an example of steps performed during operation of an embodiment of the disclosed system.

FIG. 3 is a flow chart showing an example of steps performed during operation of an embodiment of the disclosed system. The steps of FIG. 3 may, for example, be performed by the Identity Data Collector 112 shown in FIGS. 1 and 2. At step 302, the disclosed system collects identity data associated with a user from multiple service providers. Each of the service providers provides a different online service to the user, and the identity data collected from each of the service providers includes at least one identity attribute describing the user's use of the online service provided by the service provider. At step 302, the collected identity data is aggregated into a global profile associated with the user. The global profile securely stores the collected identity data, such that operations that access the global profile must be authorized by the user. At step 304, the disclosed system distributes portions of the global profile to multiple risk engines. The distribution of the global profile at step 304 is in response to at least one distribution authorization received from the user. The distribution authorization indicates at least one portion of the global profile, and the distribution performed at step 304 includes sending the indicated portion of the global profile to at least one of the trusted risk engines, for use by the trusted risk engine in performing risk assessments in response to requests to access at least one secure resource.

Figure 4:
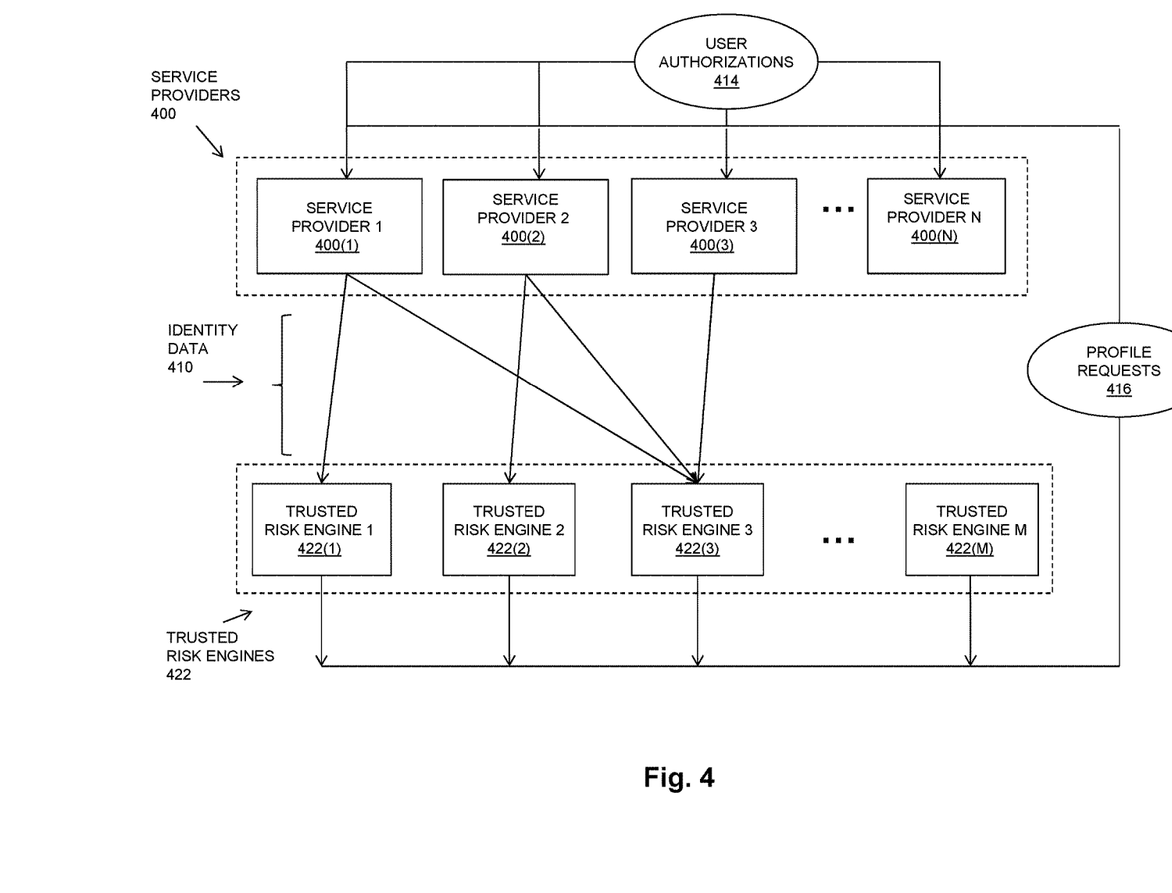
FIG. 4 is a block diagram showing an operational environment including an alternative illustrative embodiment of the disclosed system.

FIG. 4 is a block diagram showing an operational environment including an alternative illustrative embodiment of the disclosed system. In the alternative embodiment of FIG. 4, the functions of the disclosed system are distributed into multiple different components of a distributed system. Specifically, as shown in FIG. 4, Service Providers 400 include N different service providers, shown by Service Provider 1 400(1), Service Provider 2 400(2), Service Provider 3 400 (3), through Service Provider N 400(N). Each one of Service Providers 400 provides a different online service to the user. In response to User Authorizations 414 from the user, and/or in response to Profile Requests 416 from individual ones of the Trusted Risk Engines 422, each one of Service Providers 400 may distribute local identity data that describes the user's use of the online service provided by that individual service provider, as shown by Identity Data 410, to specific ones of the Trusted Risk Engines 422, as indicated by User Authorizations 414 and/or Profile Requests. As shown for purposes of illustration in FIG. 4, Service Provider 1 400(1) provides local identity data describing the user's use of the online service provided by Service Provider 1 400(1) to Trusted Risk Engine 1 422(1), and to Trusted Risk Engine 3 422(3). Service Provider 2 400(2) provides local identity data describing the user's use of the online service provided by Service Provider 2 400(2) to Trusted Risk Engine 2 422(2), and to Trusted Risk Engine 3 422(3). And Service Provider 3 400(3) provides local identity data describing the user's use of the online service provided by Service Provider 3 400(3) to Trusted Risk Engine 3 422(3).

The disclosed system may be embodied to provide significant improvements over previous systems. For example, the disclosed system advantageously leverages identity data that is collected across multiple service providers. The disclosed system may also advantageously enable users to selectively share the identity data collected from multiple service providers with specific trusted risk engines. The distribution of identity data aggregated from different service providers helps provide more reliable and effective risk assessments for access control and/or authentication. And enabling users to indicate which systems have access to specific portions of their identity data helps preserve user privacy.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A computer-implemented method for aggregating user identity data from multiple sources, comprising executing, on at least one processor, the steps of:

collecting identity data associated with a user from a plurality of service providers, wherein each of the service providers provides a different online service to the user, and wherein the identity data collected from each of the service providers includes at least one identity attribute describing the user's use of the online service provided by the service provider, wherein the identity attribute describing the user's use of the online service provided by at least one of the service providers comprises a result of a risk assessment performed by the service provider in response to a request by the user to access the online service provided by the service provider, and wherein the result of the risk assessment performed by the service provider comprises a risk score indicating a probability calculated at the time of the request by the user to access the online service provided by the service provider that the request was issued by an imposter;

aggregating the collected identity data into a global profile associated with the user, wherein the global profile stores the collected identity data and is securely maintained such that operations that access the global profile must be authorized by the user;

distributing the global profile to a plurality of trusted risk engines, wherein the distributing is in response to at least one distribution authorization received from the user, wherein the distribution authorization indicates at least one portion of the global profile, and wherein the distributing includes sending the indicated portion of the global profile to at least one of the trusted risk engines for use by the trusted risk engine in performing risk assessments in response to requests to access at least one secure resource; and preventing access to at least one secure resource in response to a subsequently calculated risk score exceeding a predetermined threshold, wherein the subsequently calculated risk score is calculated in response to a subsequently received request to access the secure resource, wherein the subsequently calculated risk score is calculated by one of the trusted risk engines, and wherein the subsequently calculated risk score is calculated at least in part using the distributed global profile.

2. The method of claim 1, wherein the distribution authorization further indicates a subset of the trusted risk engines to which the portion of the global profile is to be distributed; and wherein distributing the global profile to the plurality of trusted risk engines comprises sending the indicated portion of the global profile only to the subset of the trusted risk engines indicated by the distribution authorization.

3. The method of claim 1, further comprising:

receiving at least one identity data source authorization from the user, wherein the identity data source authorization indicates the plurality of service providers from which identity data associated with the user is to be collected; and wherein collecting the identity data associated with the user is responsive to the identity data source authorization received from the user, and comprises collecting identity data associated with the user only from service providers identified by the identity data source authorization received from the user.

4. The method of claim 1, wherein the collected identity data has a plurality of different formats;

wherein aggregating the collected identity information into the global profile includes generating normalized user identity data at least in part by reformatting the collected identity data to match at least one normalized format; and wherein distributing the global profile to the plurality of trusted risk engines includes distributing the normalized user identity data to the plurality of trusted risk engines.

5. The method of claim 4, wherein an identity attribute describing the user's use of the online service collected from a first one of the service providers comprises a first risk score resulting from a risk assessment performed by the first one of the service providers in response to a request by the user to access the online service provided by the first one of the service providers, wherein the first risk score has a first risk score format;

wherein an identity attribute describing the user's use of the online service collected from a second one of the service providers comprises a second risk score resulting from a risk assessment performed by the second one of the service providers in response to a request by the user to access the online service provided by the second one of the service providers, wherein the second risk score has a second risk score format; and wherein generating normalized user identity data includes generating a third risk score that is an average of the first risk score and the second risk score, wherein the third risk score has a normalized risk score format, and wherein the normalized risk score format is different from the first risk score format and the second risk score format.

6. The method of claim 1, wherein distributing the global profile is further responsive to a request received from one of the trusted risk engines;

wherein the request indicates a subset of the plurality of service providers; and wherein distributing the global profile includes sending only identity data collected from the subset of service providers indicated by the request to the one of the trusted risk engines from which the request was received.

7. The method of claim 1, wherein distributing the global profile is further responsive to a request received from one of the trusted risk engines;

wherein the request indicates an event condition; and wherein distributing the global profile sends the portion of the global profile to the one of the trusted risk engines from which the request was received in response to detecting the event condition.

8. An apparatus, comprising:

memory; and processing circuitry coupled to the memory, the memory storing program code for aggregating user identity data from multiple sources which, when executed by the processing circuitry, causes the processing circuitry to:

collect identity data associated with a user from a plurality of service providers, wherein each of the service providers provides a different online service to the user, and wherein the identity data collected from each of the service providers includes at least one identity attribute describing the user's use of the online service provided by the service provider, wherein the identity attribute describing the user's use of the online service provided by at least one of the service providers comprises a result of a risk assessment performed by the service provider in response to a request by the user to access the online service provided by the service provider, and wherein the result of the risk assessment performed by the service provider comprises a risk score indicating a probability calculated at the time of the request by the user to access the online service provided by the service provider that the request was issued by an imposter, aggregate the collected identity data into a global profile associated with the user, wherein the global profile stores the collected identity data and is securely maintained such that operations that access the global profile must be authorized by the user, distribute the global profile to a plurality of trusted risk engines, wherein the global profile is distributed in response to at least one distribution authorization received from the user, wherein the distribution authorization indicates at least one portion of the global profile, and wherein the global profile is distributed at least in part by sending the indicated portion of the global profile to at least one of the trusted risk engines for use by the trusted risk engine in performing risk assessments in response to requests to access at least one secure resource, and prevent access to at least one secure resource in response to a subsequently calculated risk score exceeding a predetermined threshold, wherein the subsequently calculated risk score is calculated in response to a subsequently received request to access the secure resource, wherein the subsequently calculated risk score is calculated by one of the trusted risk engines, and wherein the subsequently calculated risk score is calculated at least in part using the distributed global profile.

9. The apparatus of claim 8, wherein the distribution authorization further indicates a subset of the trusted risk engines to which the portion of the global profile is to be distributed; and wherein the global profile is distributed to the plurality of trusted risk engines by sending the indicated portion of the global profile only to the subset of the trusted risk engines indicated by the distribution authorization.

10. The apparatus of claim 8, wherein the program code for aggregating user identity data from multiple sources, when executed by the processing circuitry, further causes the processing circuitry to:

receive at least one identity data source authorization from the user, wherein the identity data source authorization indicates the service providers in the plurality of service providers from which identity data associated with the user is to be collected; and wherein the identity data associated with the user is collected responsive to the identity data source authorization received from the user, and wherein identity data associated with the user is collected only from service providers identified by the identity data source authorization received from the user.

11. The apparatus of claim 8, wherein the collected identity data has a plurality of different formats;

wherein the collected identity information is aggregated into the global profile by generating normalized user identity data at least in part by reformatting the collected identity data to match at least one normalized format; and wherein the global profile is distributed to the plurality of trusted risk engines by distributing the normalized user identity data to the plurality of trusted risk engines.

12. The apparatus of claim 11, wherein an identity attribute describing the user's use of the online service collected from a first one of the service providers comprises a first risk score resulting from a risk assessment performed by the first one of the service providers in response to a request by the user to access the online service provided by the first one of the service providers, wherein the first risk score has a first risk score format;

wherein an identity attribute describing the user's use of the online service collected from a second one of the service providers comprises a second risk score resulting from a risk assessment performed by the second one of the service providers in response to a request by the user to access the online service provided by the second one of the service providers, wherein the second risk score has a second risk score format; and wherein generating normalized user identity data includes generating a third risk score that is an average of the first risk score and the second risk score, wherein the third risk score has a normalized risk score format, and wherein the normalized risk score format is different from the first risk score format and the second risk score format.

13. The apparatus of claim 8, wherein the global profile is distributed further responsive to a request received from one of the trusted risk engines;

wherein the request indicates a subset of the plurality of service providers; and wherein the global profile is distributed by sending only identity data collected from the subset of service providers indicated by the request to the one of the trusted risk engines from which the request was received.

14. The apparatus of claim 8, wherein the global profile is distributed further responsive to a request received from one of the trusted risk engines;

wherein the request indicates an event condition; and wherein the global profile is distributed by sending the portion of the global profile to the one of the trusted risk engines from which the request was received in response to detecting an occurrence of the event condition.

15. A computer program product having a non-transitory computer readable medium that stores a set of instructions operable to aggregate user identity data from multiple sources, the set of instructions, when executed by processing circuitry, causing the processing circuitry to:

collect identity data associated with a user from a plurality of service providers, wherein each of the service providers provides a different online service to the user, and wherein the identity data collected from each of the service providers includes at least one identity attribute describing the user's use of the online service provided by the service provider, wherein the identity attribute describing the user's use of the online service provided by at least one of the service providers comprises a result of a risk assessment performed by the service provider in response to a request by the user to access the online service provided by the service provider, and wherein the result of the risk assessment performed by the service provider comprises a risk score indicating a probability calculated at the time of the request by the user to access the online service provided by the service provider that the request was issued by an imposter;

aggregate the collected identity data into a global profile associated with the user, wherein the global profile stores the collected identity data and is securely maintained such that operations that access the global profile must be authorized by the user;

distribute the global profile to a plurality of trusted risk engines, wherein the distributing is in response to at least one distribution authorization received from the user, wherein the distribution authorization indicates at least one portion of the global profile, and wherein the global profile is distributed at least in part by sending the indicated portion of the global profile to at least one of the trusted risk engines for use by the trusted risk engine in performing risk assessments in response to requests by the user to access at least one secure resource; and prevent access to at least one secure resource in response to a subsequently calculated risk score exceeding a predetermined threshold, wherein the subsequently calculated risk score is calculated in response to a subsequently received request to access the secure resource, wherein the subsequently calculated risk score is calculated by one of the trusted risk engines, and wherein the subsequently calculated risk score is calculated at least in part using the distributed global profile.

16. The method of claim 1, wherein preventing access to at least one secure resource in response to the subsequently calculated risk score exceeding the predetermined threshold comprises preventing access to at least one of the online services in response to the subsequently calculated risk score exceeding the predetermined threshold.

17. The method of claim 1, further comprising:
combining the risk scores collected from the service providers to generate a global normalized risk score; and
wherein distributing the global profile includes distributing the global normalized risk score to the plurality of trusted risk engines.

18. The method of claim 17, wherein combining the risk scores collected from the service providers to generate the global normalized risk score includes calculating an average of the risk scores collected from the service providers to generate the global normalized risk score.

* * * * *